UNITED STATES PATENT OFFICE.

CONSTANTINE SHUMAN AND ARTHUR G. WORRALL, OF PHILADELPHIA, PENNSYLVANIA, ASSIGNORS TO LOUIS J. KOLB, OF PHILADELPHIA, PENNSYLVANIA, TRADING AS SAFETEE GLASS COMPANY.

BULLET-PROOF GLASS.

No Drawing.    Application filed November 11, 1922.   Serial No. 600,404.

*To all whom it may concern:*

Be it known that we, CONSTANTINE SHUMAN and ARTHUR G. WORRALL, both citizens of the United States, and residents of Philadelphia, county of Philadelphia, State of Pennsylvania, have invented an Improvement in Bullet-Proof Glass, of which the following is a specification.

Our invention has for its object the construction of sheet glass in laminated form associated with a non-brittle binder for firmly uniting or welding the layers of glass into a concrete sheet and in such manner as to provide great strength and especially resistance to bullets from fire arms, the construction further being such that even though the glass may be cracked in resisting the penetration of the bullet, the shattered glass is held against scattering.

Our invention more particularly consists in forming the composite laminated sheet glass in such manner that one of the sheets is of relatively great thickness and rigidity and said sheet associated upon one or both of its surfaces with a relatively thin sheet of glass welded or united to the thick rigid sheet by means of an interposed binder material formed of pyroxylin or its equivalent, which positively adheres to the opposing surfaces of the glass sheets and excludes all air therefrom so that the thin sheet or sheets remain in close attachment with the heavy or rigid sheet.

In forming composite sheets of glass of the above character, we prefer that the relatively thick sheet shall be one-half inch to five-eighths of an inch in thickness and that the outer sheet or sheets of the relatively thin glass shall approximate one-eighth of an inch in thickness and that the pyroxylin binder for welding the sheets together shall be approximately two one-hundredths of an inch thick, though we do not restrict ourselves to these exact dimensions. It is desirable that the pyroxylin binder shall not be thicker than is necessary to insure proper union between the glass sheets, because thick layers of pyroxylin are not as transparent as glass and consequently tend to impart a tint to the sheets, aside from reducing its transparency. It is, therefore, desirable that the pyroxylin layer shall be as thin as possible.

We have found, in practice, that where the laminated glass is to consist of a middle heavy sheet and two outer relatively thin sheets, it is sufficient that the middle sheet shall be one-half inch in thickness and the two outer sheets each one-eighth of an inch, so that the total thickness of the composite sheet is slightly over three-quarters of an inch. In the case where we employ a single relatively thin glass sheet in conjunction with the relatively thick sheet, we have found that it is desirable that a thick sheet shall be five-eighths of an inch in thickness which, with the relatively thin glass sheet of one-eighth of an inch in thickness, will, with the pyroxylin binder, make the total thickness of the composite sheet three-quarters of an inch as before. We give these dimensions as examples, but do not restrict ourselves to the same, though it is desirable that the composite sheet shall not be of any greater thickness than is sufficient to resist the penetration of a bullet under normal conditions, first, because too great a thickness increases the cost, and, second, makes the glass heavier than is desirable.

In carrying out the construction of our improved bullet-proof glass, we employ the heavy sheet of a thickness which is practically non-flexible, whereas the relatively thin sheet of glass employed is quite flexible and, under pressure, may yield and conform itself to any general irregularity in the surface of the relative thick and non-flexible sheet, or, in case of its own unevenness of surface, to conform its shape to that of the thick sheet. The pyroxylin layer or compound between the two sheets is also yielding and flexible and permits the relatively thin sheet to readily shape itself to the surface of the heavy sheet or so nearly thereto that the thickness of the pyroxylin compound is substantially uniform for all practical purposes. When the relatively thick sheet of glass is associated or assembled with the relatively thin sheet or sheets of glass and the pyroxylin layers interposed between them and the thick glass, the same are placed in a flexible container, such, for example, as a rubber bag from which the air is preferably exhausted so as to cause the sides of the bag to press upon the outer surfaces of the assembled glass sheets; and thereafter, the bag, with its contents, is submitted to hydraulic pressure and heat sufficient to soften the pyroxylin sheet or sheets and press the flexible relatively thin sheet or sheets tightly upon the surface of the pyroxylin, so that both it and said outer sheet or sheets shape themselves to conform to the outer surfaces of the relatively thick and non-flexible sheet, whereby a perfect welding of the sheets is insured. By reason of the use of the relatively heavy sheet of glass we reduce the layers to a minimum and thus reduce to a minimum the number of surfaces required to be welded together. By reason of the use of the relatively thin sheet or sheets of glass, we reduce the danger of cracking, and are enabled to insure a more perfect union between the layers.

While ordinarily, one of the two thin sheets attached to one thick sheet is sufficient to meet requirements of use, we, however, do not restrict ourselves to the number of thick and thin sheets employed, so long as the thick and thin sheets are in adhering association as set forth.

Having now described our invention, what we claim as new and desire to secure by Letters Patent is:—

1. As an article of manufacture, a sheet of laminated glass comprising a relatively thick sheet of glass combined with a relatively thin sheet of glass secured to the surface of the relatively thick sheet of glass by a suitable binder filling the entire space between the surfaces of the glass sheets, and wherein the relatively thin sheet of glass is bent to conform to the general surface contour of the thick sheet and permanently held in such relation.

2. The invention according to claim 1, wherein the relatively thick sheet is provided on opposite sides with a relatively thin sheet of the same general character and attached in a similar manner.

3. As an article of manufacture, a composite sheet of glass composed of a plurality of glass sheets, one of which is relatively thick and non-flexible and the remaining sheet or sheets are relatively thin and flexible and are in bent form to conform to the general variations in surface contour of the thick sheet, and wherein the plurality of layers of glass are firmly united together by a pyroxylin binder.

4. As an article of manufacture, a composite sheet of glass composed of a plurality of glass sheets cemented together in fixed relation, a portion of said sheets being relatively thick and practically non-flexible and the remaining sheet or sheets being relatively thin and flexible and bent to conform to the surface contour of the adjacent glass sheet and rigidly maintained in the bent condition and relation by the cement union.

In testimony of which invention, we hereunto set our hands.

CONSTANTINE SHUMAN.
ARTHUR G. WORRALL.